June 19, 1951         L. E. ASKE         2,557,249
STATOR FOR INDUCTION MOTORS
Filed Sept. 7, 1946         2 Sheets—Sheet 1
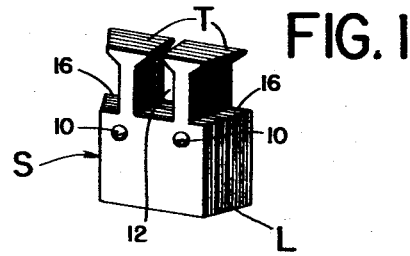
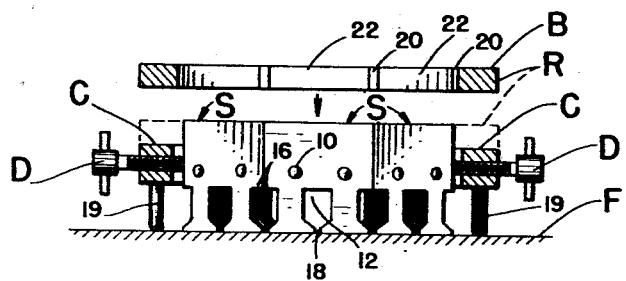
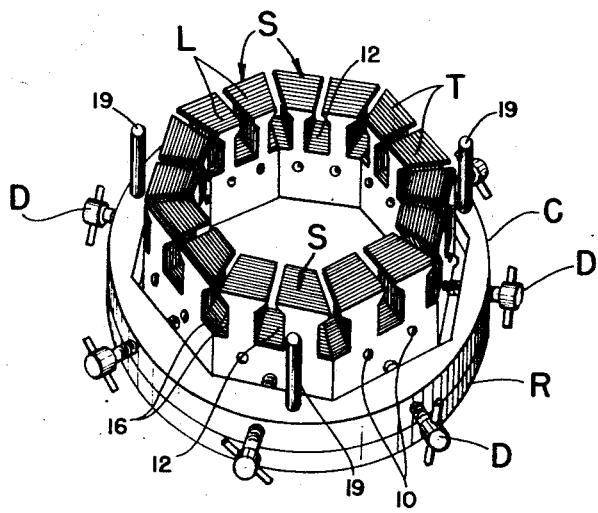
INVENTOR.-
LEONARD E. ASKE
BY Arthur R. Wylie
ATTY.

June 19, 1951  L. E. ASKE  2,557,249
STATOR FOR INDUCTION MOTORS
Filed Sept. 7, 1946  2 Sheets-Sheet 2

INVENTOR:-
LEONARD E. ASKE
BY Arthur R. Urylie
ATTY.

Patented June 19, 1951

2,557,249

UNITED STATES PATENT OFFICE 2,557,249

STATOR FOR INDUCTION MOTORS

Leonard E. Aske, Minneapolis, Minn., assignor to General Mills, Inc., a corporation of Delaware Application September 7, 1946, Serial No. 695,516

7 Claims. (Cl. 171—252)

An object of this invention is the provision of a simple, efficient stator for induction motors, particularly of the "pancake" type and one which can be readily built.

Another object is the provision of a stator of this type which can be made double-ended with a rotor at each end, each rotor operating entirely independently of the other at the same or different times and at different speeds.

These and other objects as will hereinafter appear are accomplished by this invention which is fully described in the following specifications and shown in the accompanying drawings, in which Figure 1 is a perspective view of a finished, prismatic core section;

Fig. 2 is a side elevation, partly in section, showing eight such core sections held together in an assembling jig and ready for reception of the shrink ring which holds them in assembled relation;

Fig. 3 is a perspective view of the same, inverted with the shrink ring in place;

Figure 4:
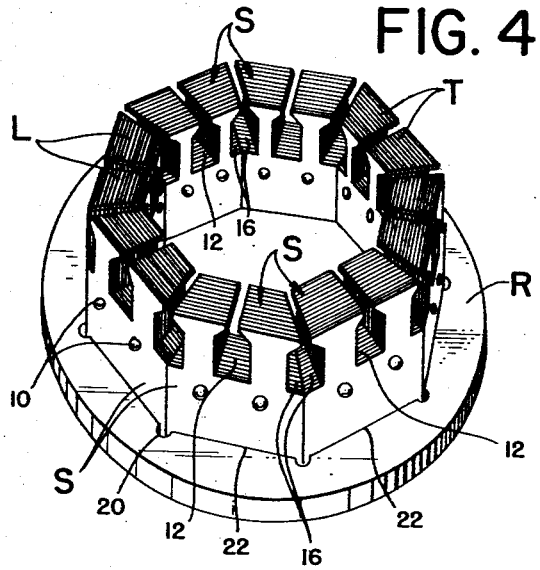
Fig. 4 is a view similar to Fig. 3 with the assembling jig removed.

The stator core, as here illustrated in Figs. 1 to 4 is preferably made up of eight identical sections S made in accordance with my co-pending application, Serial No. 700,140, filed September 28, 1946, which has now issued as United States Patent 2,495,218, held assembled as will later be described and as shown in Fig. 4 by a shrink ring R. Each core section has its prismatic sides accurately machined so that they form angles of 22½° to the vertical. This means that the two prismatic sides of the prism are at angles of 45° to each other so that they accordingly fit when eight of them are brought together as here illustrated. Other numbers of sections could be used by choosing the proper angles of the sections as is readily apparent.

Each section is made up of a plurality of laminations L of a suitable electrical silicon sheet steel having insulation formed thereon and secured together by means of rivets 10. The several laminations are punched to form a central slot 12 with a relatively narrow air gap 18 while half slots 16 are formed in the upper sides of the laminations, each of which with the half slot in the next adjacent section forms a full slot as shown in Figs. 3 and 4.

In the present form of stator for induction motor, eight of the sections S are brought together and are stood on the ends which serve as pole pieces on a convenient flat surface F. While so assembled, they are surrounded by clamping ring C which has legs 19 of a suitable length to support the clamp ring C and which has a series of clamping screws D, each of which bears on the center of one of the sections S and when uniformly tightened hold the several sections firmly in their correct, octagonal positions.

A shrink ring R, preferably of aluminum, is formed to accurately fit the octagonal exterior of these sections, preferably having rounded recesses 20 formed at the junctions of the straight side 22, the latter bearing directly upon the flat outer sides of the sections.

Owing to the large co-efficient of expansion of aluminum, when the shrink ring R is heated to a fairly high degree it can be dropped readily over the top of the section S as shown in Fig. 2, assuming the dotted line position there shown, in which the upper surface of the shrink ring is preferably on a level with the top of the sections S or perhaps a little below it. The whole is then permitted to cool so that the shrink ring firmly grips the sections after which the screws D are unloosed and the clamp ring C removed.

If it is desired to finish the bottom of the shrink ring, the assembly shown in Fig. 4 is inverted so that the stator core teeth T are placed and held face down on a magnetic chuck (not shown) after which the bottom B of the shrink ring and so much of the bottom of the sections S as extend above it are then ground or otherwise machined to flatness. This must be done carefully so as not to form burrs which extend across from one lamination to another. Otherwise, the efficiency of the motor will be impaired due to eddy current and hysteresis losses.

To grind the stator teeth T, the rotor assembly is placed on a magnetic chuck with the shrink ring R at the bottom as shown in Fig. 4.

As in the patent specification above referred to, each of the eight sections of the core is made up of a series of identical laminations which have been pre-coated with a suitable bonding cement and cured together under heat and pressure.

Figure 5:
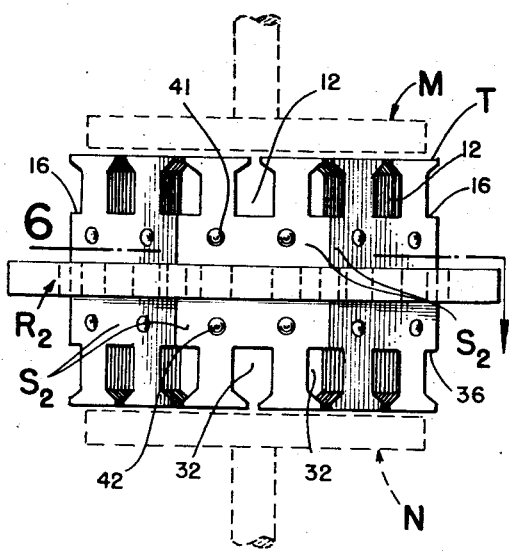
Fig. 5 is a side elevation of a modified form showing a double-ended stator core with separate rotors shown in dotted lines at its ends.
Figure 6:
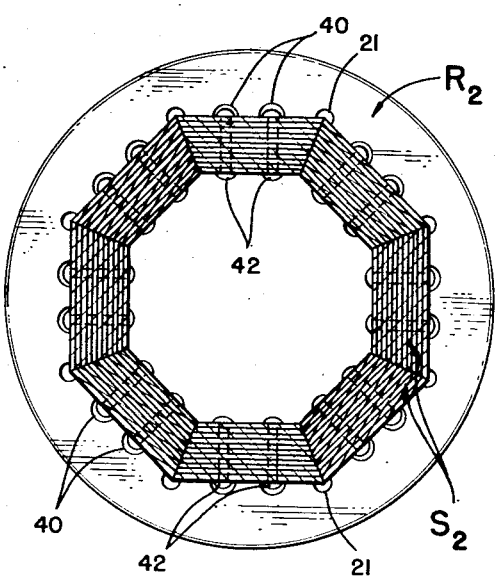
Fig. 6 is a section on the line 6 of Fig. 5.

In Figs. 5 and 6 is shown a modification of the rotor so as to enable it to operate two separate and distinct rotors M and N keyed on separate shafts which are suitably journalled, preferably in alignment, in bearings not shown so that each rotor rotates a short distance above its stator core teeth T. The length of the sections $S_2$ is nearly double that of the sections S of Figs. 1 through 4 and preferably have the same or similar slots 12 and 32 and half slots 16 and 36. Windings for such induction motors are well known and of considerably variety and are omitted as they form no part of the instant invention. It will be readily apparent that windings for two, four and eight poles may be used with corresponding speeds of the rotors which may operate entirely independently of each other as through they were in separate motors.

The assembled stators may now be treated by thoroughly cleaning to remove any burrs after grinding or otherwise machining any surface. After this the stator is dipped in a suitable insulating varnish to coat the surface against corrosion and to fill all small interstices between laminations and to prevent their humming.

Thus, it will be seen, I have provided a novel and efficient form of motor and one that can be manufactured economically.

While I have shown and described but a few embodiments of my invention, it is to be understood that it is capable of many modifications. Changes, therefore, may be made which do not depart from the spirit and scope of my invention as disclosed in the appended claims.

I claim as my invention:

1. A field core for pancake motors of the class described comprising a series of prismatic field core sections, each made up of a graduated series of steel laminations of different widths riveted together, and a clamping ring firmly holding all sections together with the edges of the laminations of one section abutting the edges of the laminations of the next adjacent sections, one end of each core section being provided with a half slot cooperating with a half slot of an adjacent section and thereby forming a full slot to receive field windings.

2. A field core for pancake motors of the class described, comprising a series of prismatic field core sections, each made up of a graduated series of steel laminations of different widths secured together, and a clamping ring firmly holding all sections together with the edges of the laminations of one section abutting the edges of the laminations of the next adjacent sections, each prismatic core section having a full radial slot in one base and a half slot at each side and spaced therefrom, the half slots of adjacent sections cooperating to form additional full radial slots between each pair of adjacent sections.

3. A field core for pancake motors comprising a series of prismatic field core sections, each made up of steel laminations secured together, and a clamping ring firmly holding all sections together with the edges of the laminations of one section abutting the edges of the laminations of the next adjacent sections, each prismatic core section having a full radial slot in one base and a half slot at each side and spaced therefrom, the half slots of adjacent sections cooperating to form additional full radial slots between each pair of adjacent sections.

4. A field core for pancake motors comprising a series of prismatic field core sections, each made up of a number of laminations lying transversely and secured together and having a full slot formed in one base and a half slot formed at each side and spaced therefrom, and clamping means holding said sections in assembled relation with the half slots of adjacent sections cooperating to form additional full slots between each pair of such sections.

5. A field core for pancake motors comprising a series of prismatic field core sections, each made up of a plurality of laminations secured together with their edges in smooth alignment, and clamping means holding all the sections together with the aligned edges of the laminations of one section abutting the aligned edges of the laminations of the next adjacent section, one end of each core section having a half slot at one edge cooperating with a half slot of the adjacent section and forming a full slot to receive field windings.

6. A field core for pancake motors comprising a series of prismatic field core sections, each made up of a plurality of laminations of different widths secured together with the widest and narrowest laminations constituting outer and inner parallel prism faces and with the lateral edges of all the laminations aligned to form intermediate prism faces, and securing means holding all the sections rigidly together with the aligned lateral edges of intermediate faces of adjacent sections abutting each other, one base of each core section having a half slot at the intersection of the base and an intermediate prism face for cooperation with a half slot of the adjacent core section to receive field windings.

7. A field core for pancake motors comprising a series of prismatic field core sections, each made up of a plurality of laminations of uniformly different widths secured together with the widest and narrowest laminations constituting opposite parallel outer and inner prism faces and with the respective lateral edges of all the laminations aligned to form intermediate non-parallel prism faces, and external clamping means holding all the sections together with the intermediate prism faces of adjacent sections abutting each other and constituting the sole internal supporting means opposing inward movement of the sections under the force applied by the external clamping means.

LEONARD E. ASKE.

REFERENCES CITED

The following references are of record in the file of this patent:

UNITED STATES PATENTS

| Number | Name | Date |
|---|---|---|
| 570,914 | Dorman | Nov. 10, 1896 |
| 1,085,116 | Ford | Jan. 27, 1914 |
| 1,605,796 | Tanzler | Nov. 2, 1926 |
| 1,756,672 | Barr | Apr. 29, 1930 |
| 2,304,607 | Sleeter | Dec. 8, 1942 |
| 2,356,779 | Morrison | Aug. 29, 1944 |
| 2,446,999 | Camilli | Aug. 17, 1948 |